United States Patent
Ishii

(10) Patent No.: US 8,843,074 B2
(45) Date of Patent: Sep. 23, 2014

(54) USER APPARATUS, BASE STATION APPARATUS AND COMMUNICATION CONTROL METHOD IN MOBILE COMMUNICATION SYSTEM

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 877 days.

(21) Appl. No.: 12/528,593

(22) PCT Filed: Feb. 21, 2008

(86) PCT No.: PCT/JP2008/052968
§ 371 (c)(1),
(2), (4) Date: Oct. 13, 2009

(87) PCT Pub. No.: WO2008/105311
PCT Pub. Date: Sep. 4, 2008

(65) Prior Publication Data
US 2010/0120370 A1 May 13, 2010

(30) Foreign Application Priority Data
Feb. 28, 2007 (JP) ................. 2007-050836

(51) Int. Cl.
*H04B 17/00* (2006.01)
*H04W 36/38* (2009.01)
*H04B 7/08* (2006.01)
*H03C 7/02* (2006.01)
*H04B 1/02* (2006.01)
*H04B 7/02* (2006.01)

(52) U.S. Cl.
CPC .............. *H04B 7/022* (2013.01); *H04W 36/38* (2013.01); *H04B 17/0042* (2013.01); *H04B 2201/709709* (2013.01); *H04B 17/0077* (2013.01); *H04B 2201/70702* (2013.01); *H04B 7/0825* (2013.01)
USPC ....................................... 455/67.11; 455/101

(58) Field of Classification Search
CPC .... H04B 7/0408; H04B 7/0456; H04B 7/046; H04W 52/42
See application file for complete search history.

(56) References Cited

U.S. PATENT DOCUMENTS

2002/0071404 A1* 6/2002 Park et al. ..................... 370/331
2002/0080762 A1* 6/2002 Zeira et al. .................... 370/342

(Continued)

FOREIGN PATENT DOCUMENTS

JP 10-503356 3/1998
JP 2002-232930 A 8/2002

(Continued)

OTHER PUBLICATIONS

Patent Abstracts of Japan, Publication No. 2002-232930, dated Aug. 16, 2002, 1 page.

(Continued)

*Primary Examiner* — Yuwen Pan
*Assistant Examiner* — Ayodeji Ayotunde
(74) *Attorney, Agent, or Firm* — Osha Liang LLP

(57) ABSTRACT

When a mobile station to which receive diversity is applied performs measurement of best cell, the method for considering the plurality of antennas in the receive diversity is changed for each cell. The base station determines the method for considering the plurality of antennas for the receive diversity, and reports it to the mobile station as broadcast information or measurement control information.

11 Claims, 8 Drawing Sheets

(56) References Cited

U.S. PATENT DOCUMENTS

| | | | |
|---|---|---|---|
| 2002/0193146 A1* | 12/2002 | Wallace et al. | 455/562 |
| 2003/0069047 A1* | 4/2003 | Kitahara | 455/562 |
| 2003/0206601 A1* | 11/2003 | Shiu | 375/267 |
| 2004/0127175 A1* | 7/2004 | Lucidarme et al. | 455/101 |
| 2005/0059354 A1 | 3/2005 | Zhao et al. | |
| 2005/0063356 A1* | 3/2005 | Larsen et al. | 370/351 |
| 2005/0186964 A1* | 8/2005 | Aikawa et al. | 455/452.2 |
| 2007/0058586 A1* | 3/2007 | Ode et al. | 370/331 |
| 2007/0100548 A1* | 5/2007 | Small | 701/214 |
| 2007/0191066 A1* | 8/2007 | Khojastepour et al. | 455/562.1 |
| 2007/0258392 A1* | 11/2007 | Larsson et al. | 370/310 |
| 2007/0280370 A1* | 12/2007 | Liu | 375/267 |
| 2008/0161033 A1* | 7/2008 | Borran et al. | 455/522 |
| 2008/0280638 A1* | 11/2008 | Malladi et al. | 455/522 |
| 2013/0237262 A1* | 9/2013 | Borran et al. | 455/501 |

FOREIGN PATENT DOCUMENTS

| | | |
|---|---|---|
| JP | 2004-208001 A | 7/2004 |
| JP | 2006-352332 A | 12/2006 |
| JP | 2007-028436 A | 2/2007 |
| WO | 9637084 A1 | 11/1996 |
| WO | 2005115034 A1 | 12/2005 |
| WO | 2007120560 A2 | 10/2007 |

OTHER PUBLICATIONS

Patent Abstracts of Japan, Publication No. 2007-028436, dated Feb. 1, 2007, 1 page.

Patent Abstracts of Japan, Publication No. 2006-352332, dated Dec. 28, 2006, 1 page.

3GPP TR 25.814 V7.0.0, Jun. 2006, "Physical layer aspects for evolved Universal Terrestrial Radio Access (UTRA)," 126 pages.

3GPP TSG RAN WG Meeting #47bis, R1-070103, Sorrento, Italy, Jan. 15-19, 2007, "Downlink L1/L2 Control Signaling Channel Structure: Coding," 17 pages.

3GPP TS 36.211 V0.3.1, Feb. 2007, Physical Channels and Modulation, 29 pages.

3GPP TSG RAN WG1 Meeting #47bis, R1-070105 (Original R1-063326), Sorrento, Italy, Jan. 15-19, 2007, "ACK/NACK Signal Structure in E-UTRA Downlink," 3 pages.

3GPP TS 25.331 V6.11.0, Sep. 2006, "Radio Resource Control (RRC)," 1247 pages.

TSG-RAN Working Group 4 (Radio) meeting #41, R4-061294, Riga, Latvia, Nov. 6-10, 2006, "RRM measurements on a WCDMA UE with multiple antenna connectors," 4 pages.

TSG-RAN Working Group 4 (Radio) meeting #42, R4-070238, St. Louis, USA, Feb. 12-16, 2007, "Further discussion on RRM measurements on a WCDMA UE with multiple antenna connectors," 3 pages.

International Search Report issued in PCT/JP2008/052968, mailed on Mar. 18, 2008, with translation, 7 pages.

Written Opinion issued in PCT/JP2008/052968, mailed on Mar. 18, 2008, 3 pages.

Japanese Office Action for Application No. 2009-501205, mailed on May 8, 2012 (4 pages).

Patent Abstracts of Japan for Japanese Publication No. 2004-208001, publication date Jul. 22, 2004 (1 page).

esp@cenet Patent Abstract for WO 9637084, publication date Nov. 21, 1996. (1 page).

Extended European Search Report for 08711751.1 dated Feb. 21, 2014 (10 pages).

\* cited by examiner

| | MEASUREMENT OBJECTS |
|---|---|
| OPTION 1 | REFERENCE SIGNAL RECEIVED POWER |
| OPTION 2 | RATIO BETWEEN REFERENCE SIGNAL RECEIVED POWER AND TOTAL RECEIVED POWER INCLUDING NOISE POWER |
| OPTION 3 | PATH LOSS |

| | METHODS FOR CONSIDERING TWO ANTENNAS |
|---|---|
| OPTION 1 | MEASURE VALUE MEASURED BY MAIN SINGLE ANTENNA |
| OPTION 2 | MEASURE AVERAGE VALUE OF VALUES MEASURED BY TWO ANTENNAS |
| OPTION 3 | MEASURE SUM OF VALUES MEASURED BY TWO ANTENNAS |

PATTERN (A)

|  | MEASUREMENT OBJECTS | METHODS FOR CONSIDERING TWO ANTENNAS |
|---|---|---|
| OPTION 1 | REFERENCE SIGNAL RECEIVED POWER | MEASURE SUM OF VALUES MEASURED BY TWO ANTENNAS |
| OPTION 2 | RATIO BETWEEN REFERENCE SIGNAL RECEIVED POWER AND TOTAL RECEIVED POWER INCLUDING NOISE POWER | MEASURE AVERAGE VALUE OF VALUES MEASURED BY TWO ANTENNAS |
| OPTION 3 | PATH LOSS | MEASURE VALUE MEASURED BY MAIN SINGLE ANTENNA |

FIG.5B

PATTERN (B)

|  | MEASUREMENT OBJECTS | METHODS FOR CONSIDERING TWO ANTENNAS |
|---|---|---|
| OPTION 1 | REFERENCE SIGNAL RECEIVED POWER | MEASURE SUM OF VALUES MEASURED BY TWO ANTENNAS |
| OPTION 2 | RATIO BETWEEN REFERENCE SIGNAL RECEIVED POWER AND TOTAL RECEIVED POWER INCLUDING NOISE POWER | MEASURE AVERAGE VALUE OF VALUES MEASURED BY TWO ANTENNAS |
| OPTION 3 | PATH LOSS | MEASURE VALUE MEASURED BY MAIN SINGLE ANTENNA |
| OPTION 4 | PATH LOSS | MEASURE SUM OF VALUES MEASURED BY TWO ANTENNAS |

FIG.5C

PATTERN (C)

|  | MEASUREMENT OBJECTS | METHODS FOR CONSIDERING TWO ANTENNAS |
|---|---|---|
| OPTION 1 | REFERENCE SIGNAL RECEIVED POWER | MEASURE VALUE MEASURED BY MAIN SINGLE ANTENNA |
| OPTION 2 | REFERENCE SIGNAL RECEIVED POWER | MEASURE SUM OF VALUES MEASURED BY TWO ANTENNAS |

FIG.5D

PATTERN (D)

|  | MEASUREMENT OBJECTS | METHODS FOR CONSIDERING TWO ANTENNAS |
|---|---|---|
| OPTION 1 | REFERENCE SIGNAL RECEIVED POWER | MEASURE AVERAGE VALUE OF VALUES MEASURED BY TWO ANTENNAS |
| OPTION 2 | REFERENCE SIGNAL RECEIVED POWER | MEASURE SUM OF VALUES MEASURED BY TWO ANTENNAS |

USER APPARATUS, BASE STATION APPARATUS AND COMMUNICATION CONTROL METHOD IN MOBILE COMMUNICATION SYSTEM

TECHNICAL FIELD

The present invention relates to a long term evolution (LTE) system. More particularly, the present invention relates to a user apparatus, a base station apparatus, a mobile communication system and a communication control method.

BACKGROUND ART

3GPP that is a standardization group of W-CDMA is studying a communication scheme that becomes a successor to W-CDMA and HSDPA, that is, 3GPP is studying Long Term Evolution (LTE). As radio access schemes, OFDM (Orthogonal Frequency Division Multiplexing) is being studied for downlink, and SC-FDMA (Single-Carrier Frequency Division Multiple Access) is being studied for uplink (refer to non-patent document 1, for example).

OFDM is a multicarrier scheme for dividing a frequency band into a plurality of narrow frequency bands (subcarriers) so as to perform transmission by carrying data on each subcarrier. By arranging the subcarriers on frequencies densely without interfering with each other while a part of them overlap, high speed transmission is realized so that efficiency of use of frequency increases.

SC-FDMA is a single carrier scheme that can decrease interference among terminals by dividing frequency band and performing transmission using frequency bands that are different among a plurality of terminals. Since the SC-FDMA has characteristics that variation of transmission power becomes small, low power consumption in the terminal and wide coverage can be realized.

By the way, in the mobile communication system, in order to improve transmission characteristics, there is a case in which receive diversity for receiving a signal using two or more antennas is applied. It is planned that the mobile station in LTE is generally provided with two antennas for applying receive diversity in order to improve transmission characteristics of the downlink. The mobile station can be called a user apparatus (UE: User Equipment) more generally. When the mobile station is provided with two antennas so that receive diversity is applied, cost and size of the mobile station become large. Thus, the receive diversity is not essential in W-CDMA.

In order to avoid that cost and size of the mobile station become large when the mobile station is provided with two antennas, there is a case in which a sensitive and high-performance antenna is provided as one of the two antennas, and a low-performance antenna which is relatively not sensitive is provided as another of the two antennas. For convenience of explanation, the former antenna is called a main antenna, and the latter is called a sub-antenna. In addition, in this case, generally, for performing uplink transmission, the former sensitive and high-performance antenna is used for transmission. That is, in the downlink, reception is performed using two antennas. In the uplink, transmission is performed using the high-performance antenna of the two antennas.

In the mobile communication system, a communication area is comprised of a plurality of cells. The mobile station performs communication in one or more cells in the plurality of cells. In LTE, since hard handover is applied, the mobile station communicates with one cell, and when a cell having better quality than the serving cell, the mobile station performs handover to the cell of the better quality.

For example, in HSDPA to which hard handover is applied like LTE, the mobile station measures any one of pilot signal received power (CPICH RSCP), ratio between pilot signal received power and total received power including noise power (CPICH Ec/N0), and path loss. When a cell having better quality than the serving cell appears, the mobile station reports the best cell to the network. This report is called measurement report (MR). The network performs processing for changing the serving cell based on the measurement report (non-patent document 2).

The path loss is defined as follows. Pathloss in dB=Primary CPICH Tx power−CPICH RSCP, wherein Primary CPICH Tx power is pilot signal transmission power in the base station apparatus, and CPICH RSCP is pilot signal received power in the mobile station. As is clear from the above equation, path loss is a value calculated automatically from the pilot signal received power (CPICH RSCP) and the pilot signal transmission power (CPICH).

The above-mentioned report on change of best cell is called event 1D (Reporting event 1D). In addition, the network specifies, to the mobile station, which one the mobile station measures among the pilot signal received power, the ratio between pilot signal received power and total received power including noise power, and the path loss. More particularly, the network uses system information in a broadcast channel or uses a measurement control message in order to specify which one the mobile station measures among various metrics such as the pilot signal received power, the ratio between pilot signal received power and total received power including noise power, and the path loss. The network is the radio network controller (RNC) in the WCDMA.

The reason for the network to specify which one the mobile station measures among the pilot signal received power, the ratio between pilot signal received power and total received power including noise power and the path loss is for designing cells more flexibly. For example, when there are two network operators, one network operator can specify path loss to the mobile station, and another network operator can specify pilot signal received power. Alternatively, one network operator can specify path loss to the mobile station in a suburban area, and the network operator can specify pilot signal received power in an urban area.

When a mobile station that has two antennas for which receive diversity is applied performs the measurement report, it is necessary to calculate the pilot signal received power (CPICH RSCP), and the ratio between pilot signal received power and total received power including noise power (CPICH Ec/N0) in consideration of the two antennas. For example, as methods for calculating the pilot signal received power (CPICH RSCP), and the ratio between pilot signal received power and total received power including noise power (CPICH Ec/N0) for the mobile station for which receive diversity is applied, following three methods are proposed (refer to non-patent document 3, for example).

[1] Either one of the antennas is defined as a main antenna, and each of CPICH RSCP and CPICH Ec/N0 is a value measured by the main single antenna.

[2] Each of CPICH RSCP and CPICH Ec/N0 is an average value of values measured by two antennas.

[3] Each of CPICH RSCP and CPICH Ec/N0 is a sum value of values measured by two antennas.

In addition, in the three methods, the non-patent document 4 proposes the third method in which the total value of the values measured by two antennas is used.

[Non-patent document 1] 3GPP TR 25.814 (V7.0.0), "Physical Layer Aspects for Evolved UTRA," June 2006

[Non-patent document 2] 25.331 V6.11.0 2006-09

[Non-patent document 3] Nokia, R4-061294, "RRM measurements on a WCDMA UE with multiple antenna connectors", November, 2006

[Non-patent document 4] Nokia, Qualcomm, R4-070238, "Further discussion on RRM measurements on a WCDMA UE with multiple antenna connectors", February, 2007

DISCLOSURE OF THE INVENTION

Problem to be Solved by the Invention

However, there are following problems in the above-mentioned background art.

In WCDMA or in HSDPA, the pilot signal received power, the ratio between pilot signal received power and total received power including noise power, or path loss is used as an indicator for measuring cell quality, and which indicator (measurement object or metric) should be used is specified by the network. When receive diversity is performed, as the pilot signal received power, and the ratio between pilot signal received power and total received power including noise power, there is a possibility in that a value measured by main single antenna, an average value of values measured by two antennas and a sum value of values measured by two antennas and the like become different values according to the measurement method.

However, how the measurement object is measured (measurement method) is not considered in the conventional method in which only one antenna is assumed. Thus, it is difficult to apply the method used in HSDPA as it is to LTE.

That is, there is a problem in that the conventional network cannot select a reporting method from among reporting a value measured by the main single antenna, reporting an average value of values measured by two antennas and reporting a sum value of values measured by two antennas, based on difference of network operators or difference of areas such as a suburban area and an urban area.

In addition, in the above-mentioned background art, the path loss is calculated from the pilot signal received power (CPICH RSCP) and the pilot signal transmission power. Thus, when the pilot signal received power is reported as a sum value of values measured by two antennas, the value of path loss also becomes a value based on the sum value of the values measured by two antennas. Since effect of path loss in the downlink can be strongly reflected on the value, the value may be favorable for a base station that wants to know status of the downlink accurately. On the other hand, since transmission is performed using the single antenna in the uplink, it may not be favorable for a base station that wants to know uplink path loss to report the sum value to base stations impartially. From this viewpoint, it is desirable for the next generation mobile communication system to be able to flexibly reflect intension of network operators.

The present invention is conceived by considering the problems, and an object of the present invention is to configure the network to be able to specify the measurement object and the measurement method in various ways when the mobile station for which receive diversity is applied performs measurement report.

Means for Solving the Problem

In order to overcome the above problem, one aspect of the present invention relates to a user apparatus including:

a plurality of antennas;

a reception unit configured to receive signaling that specifies relationship between a measurement object and a plurality of antennas; and a measurement unit to perform measurement based on the specified relationship between the measurement object and the plurality of antennas.

In order to overcome the above problem, one aspect of the present invention relates to a base station apparatus including:

a unit configured to determine relationship between a measurement object and the plurality of antennas; and a report unit configured to report the determined relationship to the user apparatus.

In order to overcome the above problem, one aspect of the present invention relates to a communication control method including:

a step in which the base station apparatus specifies relationship between the measurement object and the plurality of antennas;

a step in which the user apparatus performs measurement of a cell having the best radio quality based on the relationship between the measurement object and the plurality of antennas; and a step of performing cell change based on the measurement result of the cell having the best radio quality.

Effect of the Invention

According to the present invention, when the mobile station to which receive diversity is applied performs measurement report, the network can variously specify measurement objects and measurement methods.

BRIEF DESCRIPTION OF THE DRAWINGS

FIG. 4 is a diagram showing an example of various measurement objects and measurement methods;

FIGS. 5A-5D are diagrams showing other examples of various measurement objects and measurement methods;

Figure 1:
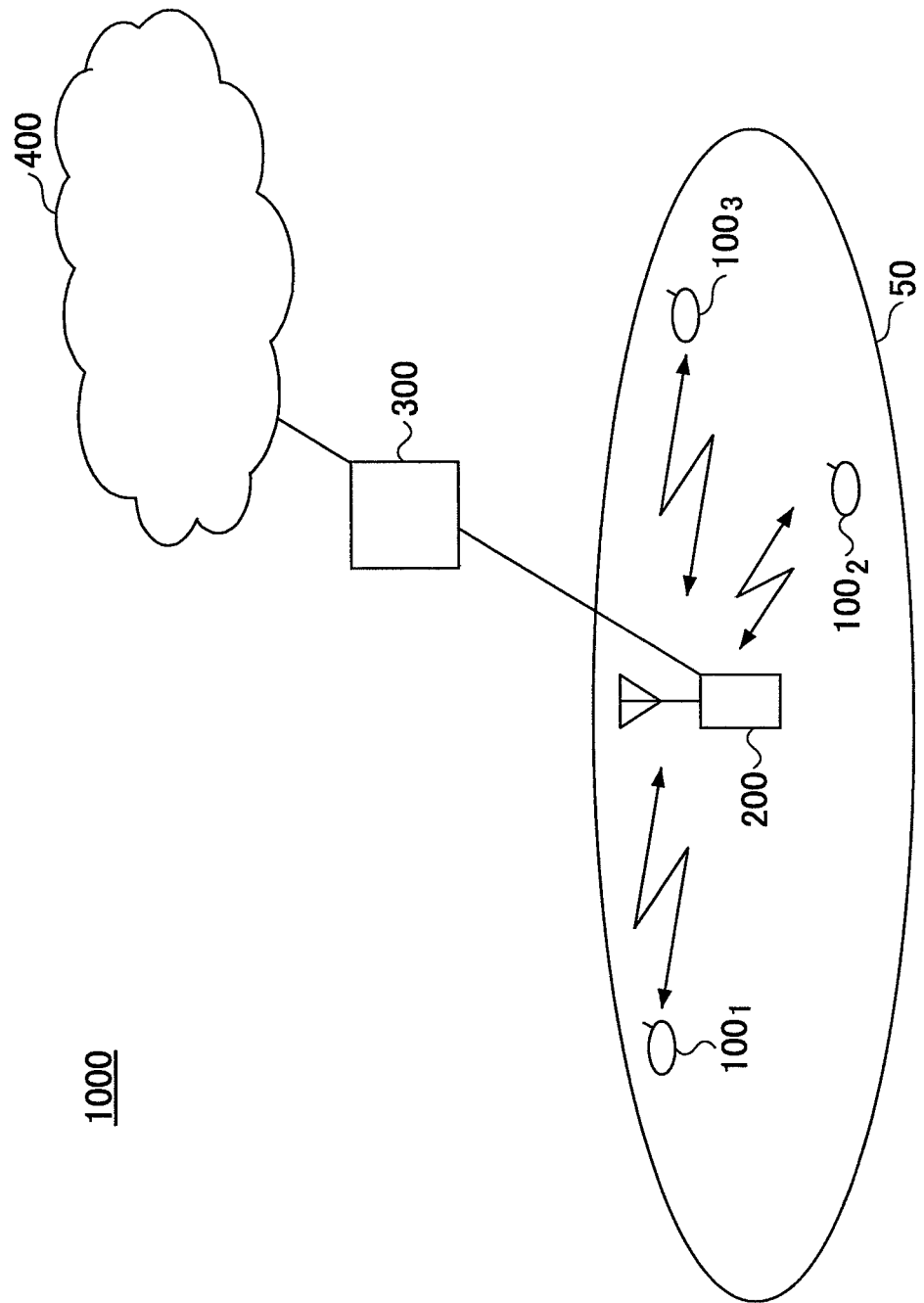
FIG. 1 is a schematic diagram showing a radio communication system according to an embodiment of the present invention.

DESCRIPTION OF REFERENCE SIGNS 50 cell
$100_1$, $100_2$, $100_3$ and $100_n$ mobile station
102 transmit and receive antenna
104 amplifier unit
106 transmit and receive unit
108 baseband processing unit
110 measurement unit
112 call processing unit
114 application unit
200 base station apparatus
202 transmit and receive antenna
204 amplifier unit 206 transmit and receive unit
208 baseband signal processing unit
210 measurement control unit
212 call processing unit
214 transmission line interface
300 access gateway apparatus
400 core network

PREFERRED EMBODIMENTS FOR CARRYING OUT THE INVENTION

According to an embodiment of the present invention, a user apparatus is used in a mobile communication system in which a plurality of metrics indicating radio propagation status are prepared. The user apparatus includes: a plurality of antennas; a first calculation unit configured to calculate a metric of uplink by using an antenna used for signal transmission; a second calculation unit configured to calculate a metric of downlink using a plurality of antennas used for receiving a signal; and a reporting unit configured to report the metric of uplink or downlink to the base station apparatus.

The base station apparatus or a network sends an instruction signal to a mobile station. The instruction signal specifies reporting a value measured by a main single antenna, reporting an average value of values measured by two antennas, or reporting a sum of values measured by two antennas when the mobile station to which receive diversity is applied performs measurement report. Accordingly, flexible cell design becomes possible, so that a higher quality network can be provided. Or, when taking into account two antennas of receive diversity, methods for considering two antennas can be changed between measurement of pilot signal received power and measurement of path loss, so that higher quality network can be provided.

In the following, preferred embodiments for carrying out the present invention are described with reference to figures based on the following examples. In all of the figures for describing examples, the same reference symbols are used for parts having the same functions, and repeated description is not provided.

The present invention especially relates to measurement control and measurement report, and relates to procedure in which the base station apparatus specifies the method of measurement, and the mobile station performs specified measurement, and reports the measurement result to the base station apparatus. Therefore, parts related to measurement control and measurement report are mainly described.

The radio communication system to which the mobile station and the base station apparatus of an embodiment of the present invention are applied is described with reference to FIG. 1.

The radio communication system 1000 is a system to which Evolved UTRA and UTRAN (Another name: Long Term Evolution, or Super 3G) is applied, for example. The radio communication system 1000 includes a base station apparatus (eNB: eNode B) 200 and a plurality of mobile stations (UE: User Equipment) $100_n$ ($100_1$, $100_2$, $100_3$, ... $100_n$, n is an integer and n>0) that are communicating with the base station apparatus 200. The base station apparatus 200 is connected to an upper station, that is, an access gateway apparatus 300, for example, and the access gateway apparatus 300 is connected to a core network 400. The mobile station $100_n$ is communicating with the base station apparatus 200 by Evolved UTRA and UTRAN.

In the following, since the mobile stations $100_n$ ($100_1$, $100_2$, $100_3$, ... $100_n$) have the same configurations, functions and states, a mobile station $100_n$ is described unless otherwise mentioned.

As radio access schemes for the radio communication system 1000, OFDM (orthogonal frequency division multiplexing) is applied to the downlink, and SC-FDMA (single carrier—frequency division multiple access) is applied to the uplink. As mentioned above, OFDM is a scheme in which a frequency band is divided into a plurality of narrow frequency bands (subcarriers) so that transmission is performed by carrying data on each subcarrier. SC-FDMA is a transmission scheme that can decrease interference among terminals by dividing a frequency band and by transmitting signals using different frequency bands among a plurality of terminals.

In the following, communication channels in the Evolved UTRA and UTRAN are described.

In the downlink, a physical downlink shared channel (PDSCH) that is shared and used by each mobile station $100_n$, and a physical downlink control channel (PDCCH) for LTE are used. In the downlink, the downlink control channel for LTE reports user information and transport format information mapped to the physical downlink shared channel, user information and transport format information mapped to the physical uplink shared channel, and acknowledgement (ACK/NACK) information of the physical uplink shared channel. The acknowledgement (ACK/NACK) information is also called Physical Hybrid ARQ Indicator Channel (PHICH).

PHICH may be defined as a different physical channel that is not included in PDCCH, but is parallel to PDCCH. User data is transmitted by the physical downlink shared channel. The user data is, as a transport channel, a downlink-shared channel (DL-SCH).

Figure 2:
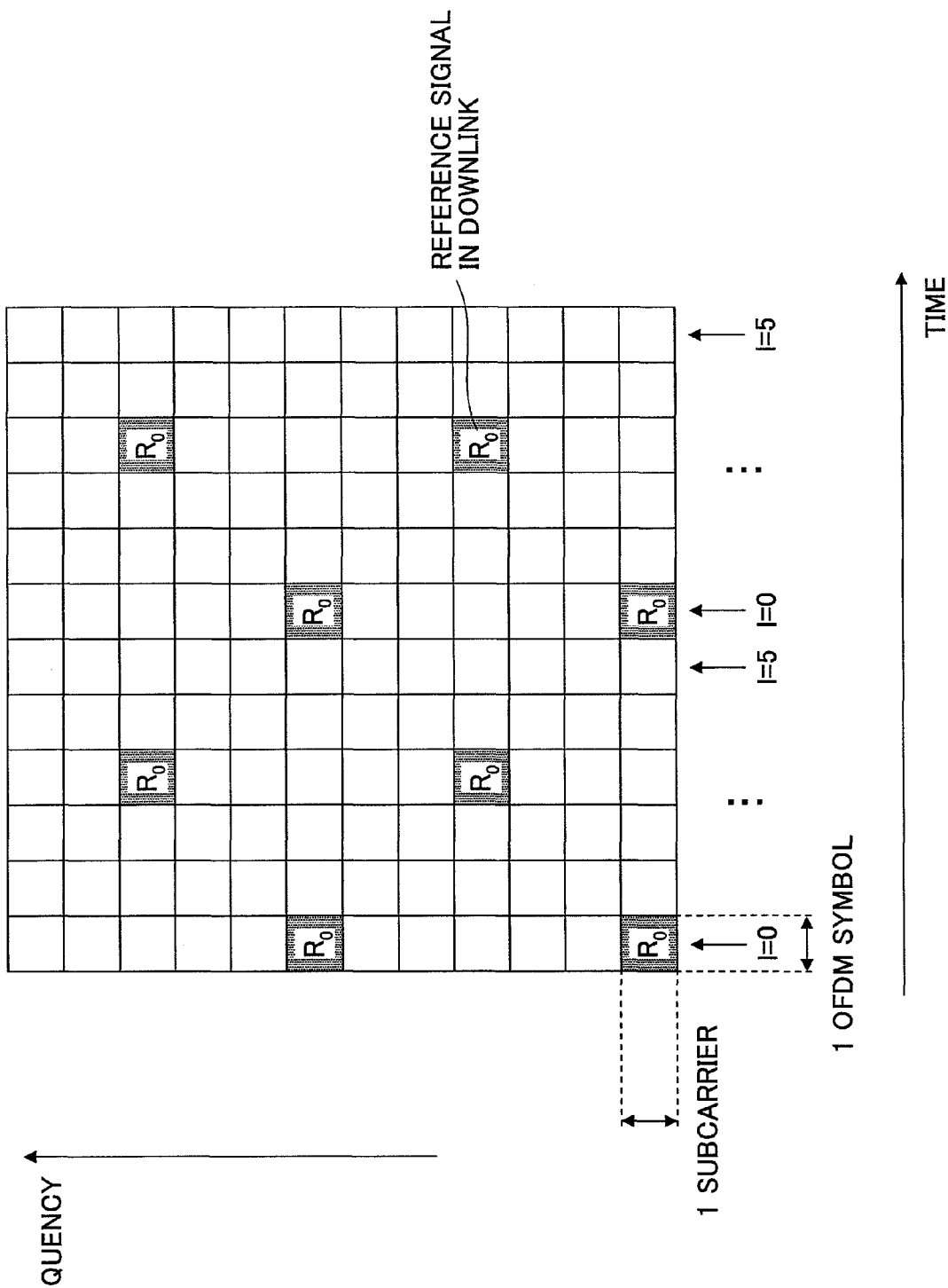
FIG. 2 is a diagram showing an example of mapping of the downlink reference signal.

In addition, in the downlink, as a pilot signal, a downlink reference signal is transmitted. The downlink reference signal in the downlink is a two dimensional sequences that are formed by two dimensional orthogonal sequences and two dimensional pseudo random sequences (non-patent document X). FIG. 2 shows an example of mapping of the downlink reference signal to physical resources. Although the above-mentioned example is formed by the two dimensional orthogonal sequence and the two dimensional pseudo random sequence, it may be configured only by the two dimensional pseudo random sequence.

In the uplink, a physical uplink shared channel (PUSCH) that is shared and used by each mobile station $100_n$, and a control channel for LTE are used. There are two types of control channels, which are a channel that is time-multiplexed to the physical uplink shared channel and a channel that is frequency-multiplexed to the physical uplink shared channel. The frequency multiplexed channel is called physical uplink control channel (PUCCH). In the uplink, the physical uplink control channel for LTE transmits downlink quality information (CQI: Channel Quality Indicator) used for shared channel scheduling in downlink and for adaptive modulation and coding (AMC), and transmits acknowledgement (ACK/NACK) information (HARQ ACK information) for the downlink shared channel. In addition, user data is transmitted by the physical uplink shared channel. As a transport channel, the user data is an uplink shared channel (UL-SCH).

Figure 3:
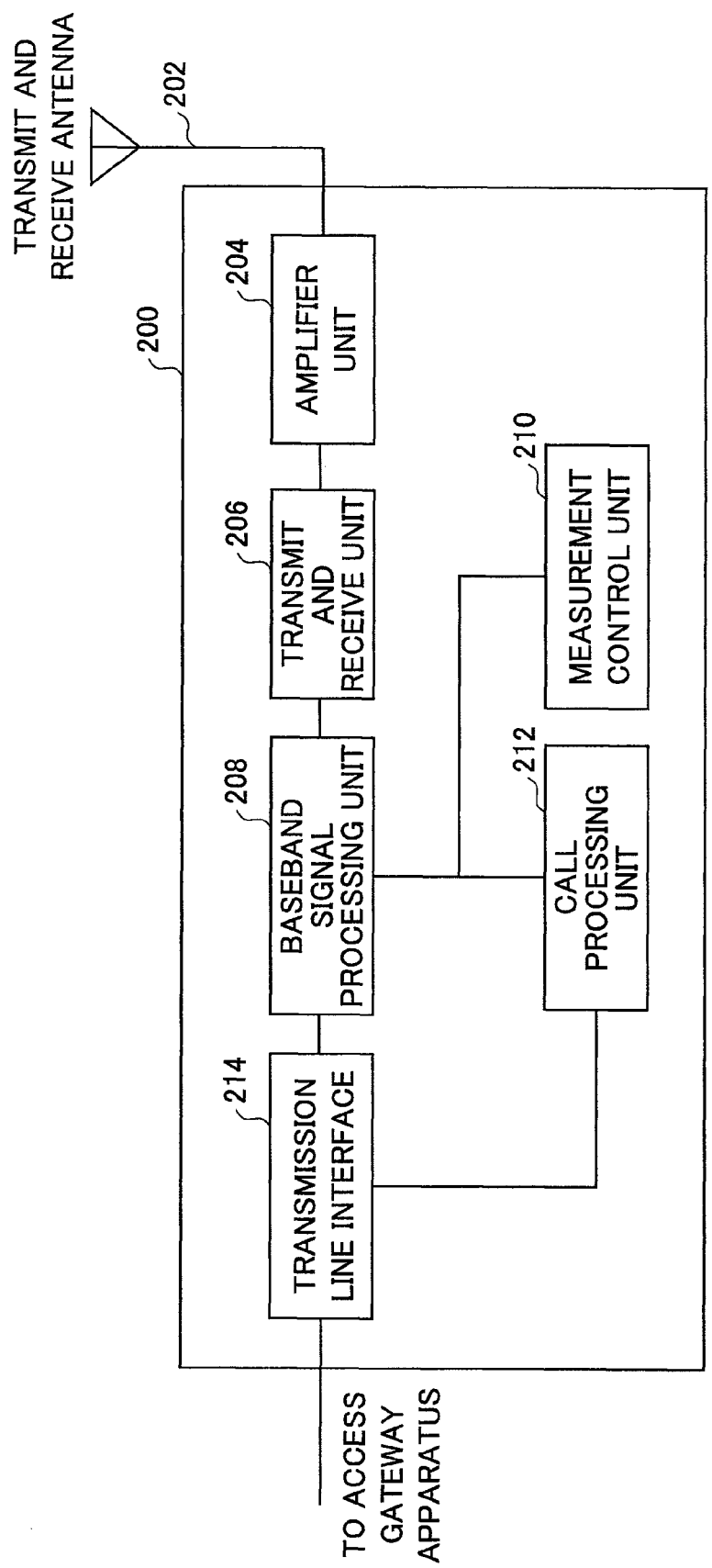
FIG. 3 is a diagram showing a base station apparatus according to an embodiment of the present invention.

The base station apparatus 200 of an embodiment of the present invention is described with reference to FIG. 3.

The base station apparatus 200 of the present embodiment includes a transmit and receive antenna 202, an amplifier unit 204, a transmit and receive unit 206, a baseband signal processing unit 208, a measurement control unit 210, a call processing unit 212, and a transmission line interface 214.

User data to be transmitted from the base station apparatus 200 to the mobile station $100_n$ in the downlink is input to the baseband signal processing unit 208 from an upper station placed in the upper side of the base station apparatus 200, that is, from an access gateway apparatus 300, for example, via the transmission line interface 214.

The baseband signal processing unit 208 performs transmission processing in the PDCP layer, transmission processing in the RLC layer such as segmentation and concatenation of user data and transmission processing of RLC (radio link control) retransmission control, MAC (Medium Access Control) retransmission control such as transmission processing of HARQ (Hybrid Automatic Repeat reQuest), scheduling, and performed transmission format selection, channel coding, and inverse fast Fourier transform (IFFT), so that the processed signal is transferred to the transmit and receive unit 206. In addition, also as to a signal of the physical downlink control channel that is a control channel of downlink, transmission processing such as channel coding and inverse fast Fourier transform is performed, so that the signal is transferred to the transmit and receive unit 206.

In addition, the baseband signal processing unit 208 receives a measurement control message from the measurement control unit 210, and receives a message from the call processing unit 212 for performing cell selection or cell change. Then, processing similar to that for user data is performed on the measurement control message and the message for performing cell selection or cell change, so that the message is transferred to the transmit and receive unit 206. Each of the measurement control message and the message for performing cell selection or cell change is one of RRC messages, and is transmitted as DCCH (Dedicated Control Channel) as a logical channel.

In addition, the baseband signal processing unit 208 receives broadcast information on measurement from the measurement control unit 210. Then, the baseband signal processing unit 208 performs processing such as channel coding and inverse fast Fourier transform also for the broadcast information on measurement, and transfers the broadcast information to the transmit and receive unit 206.

The transmit and receive unit 206 performs frequency conversion processing for converting the baseband signal output from the baseband signal processing unit 208 into a radio frequency band.

After that, the baseband signal is amplified by the amplifier unit 204 so that the signal is transmitted by the transmit and receive antenna 202.

On the other hand, as to data to be transmitted from the mobile station $100_n$ to the base station apparatus 200 in the uplink, a radio frequency signal received by the transmit and receive antenna 202 is amplified by the amplification unit 204, and is frequency-converted by the transmit and receive unit 206 so that the signal is converted to a baseband signal, and the baseband signal is input into the baseband signal processing unit 208.

The baseband signal processing unit 208 performs FFT processing, IDFT processing, error correction decoding, reception processing of MAC retransmission control, reception processing of RLC layer, and reception processing of the PDCP layer for user data included in the input baseband signal, so that the processed user data is transferred to the access gateway apparatus 300 via the transmission line interface 214.

The baseband signal processing unit 208 performs FFT processing, IDFT processing, error correction decoding, reception processing of MAC retransmission control, reception processing of RLC layer and the like also for a RRC message, sent from the mobile station $100_n$ included in the input baseband signal, such as a measurement report, and transfers the message to the call processing unit 212. In addition, for example, a RRC message for performing cell change is an example of the RRC message from the mobile station $100_n$.

The measurement control unit 210 specifies measurement quantity which is an indicator used for the mobile station $100_n$ residing in the cell 50 to perform measurement report. For example, as shown in FIG. 4, as the measurement quantity that is an object for measurement (measurement object, indicator, or metric), the measurement control unit 210 can choose from three objects that are reference signal received power, ratio between reference signal received power and total received power including noise power, and path loss. In addition, as methods of taking into account two antennas (measurement methods), the measurement control unit 210 can choose from three methods that are a method for measuring a value measured by main single antenna, a method for measuring an average value of values measured by two antennas, and a method for measuring a sum of values measured by two antennas. The main single antenna may be an antenna used for uplink transmission, for example. Alternatively, the main single antenna may be an antenna having good reception sensitivity. Or, the main single antenna may be one antenna which has the best measurement quantity. In this case, there are three measurement objects and three methods for considering two antennas. As a result, it becomes possible to select from among nine combinations of measurement objects and methods for considering two antennas.

When path loss is selected as a measurement object, the path loss is calculated as follows for each method of considering two antennas.

<When Measuring Average Value of Values Measured by the Main Single Antenna>

Pathloss in dB=RS Tx power$-$RSRP$_{TxAnt}$

<When Measuring Average Value of Values Measured by Two Antennas>

Pathloss in dB=RS Tx power$-$RSRP$_{RxAnt,Average}$

<When Measuring Sum of Values Measured by Two Antennas>

Pathloss in dB=RS Tx power$-$RSRP$_{RxAnt,Sum}$

In the equations, RS Tx power indicates reference signal transmission power in the base station apparatus 200, RSRP$_{TxAnt}$ indicates reference signal received power in the main single antenna in the mobile station $100_n$. RSRP$_{RxAnt,Average}$ indicates an average value of reference signal received powers measured by two antennas in the mobile station $100_n$, and RSRP$_{RxAnt,Sum}$ indicates a sum of reference signal received powers measured by two antennas in the mobile station $100_n$. Rs Tx power is signaled from the base station apparatus 200 to the mobile station $100_n$ by broadcast information and the like, for example.

When the ratio between reference signal received power and total received power including noise power is selected as the measurement object, it is necessary to perform two kinds of measurements for the reference signal received power and the total received power including noise power. In this case, as to the total received power including noise power, an average value of values measured by two antennas may be measured as the method for considering two antennas, and as to the reference signal received power, a method may be selected from the options shown in FIG. 4 as a method for considering two antennas.

As mentioned above, the base station apparatus 200 according to the present invention can select optimum measurement quantity for the cell, that is, the base station apparatus 200 can select a measurement object and a method for considering two antennas from among the nine patterns. Thus, more flexible cell design becomes available, so that a higher quality network can be provided.

Alternatively, for example, as shown in FIG. 5A, as the measurement quantity, methods for considering two antennas may be different among the reference signal received power, the ratio between reference signal received power and total received power including noise power, and path loss. More particularly, as to the reference signal received power, measuring the sum of values measured by two antennas is adopted as the method for considering two antennas. As to the ratio between reference signal received power and total received power including noise power, measuring the average value of values measured by two antennas is adopted as the method for considering two antennas. As to the path loss, measuring a value measured by the main single antenna is adopted as the method for considering two antennas. In the example, an antenna used for uplink transmission may be used as the main single antenna. Path loss is calculated as shown in the following equation.

$$\text{Pathloss in dB} = \text{RS Tx power} - \text{RSRP}_{TxAnt}$$

In the equation, RS Tx power indicates reference signal transmission power in the base station apparatus 200, $\text{RSRP}_{TxAnt}$ indicates reference signal received power of the main single antenna in the mobile station $100_n$. The RS Tx power is signaled from the base station apparatus 200 to the mobile station $100_n$ by broadcast information and the like, for example. Since $\text{RSRP}_{TxAnt}$ is reference signal received power of the main single antenna, it is different from reference signal received power that is measured as the sum of values measured by two antennas. In this case, since both antennas are taken into account for the reference signal received power and for the ratio between reference signal received power and total received power including noise power, it leads to measuring radio quality of downlink. As to the path loss, since the main antenna or an antenna used for uplink transmission is taken into account, it leads to measuring radio quality of uplink. That is, it becomes possible that the base station apparatus 200 selects an optimum measurement quantity for the cell by considering downlink and uplink as mentioned above, so that more flexible cell design becomes possible and a higher quality network can be provided.

The combinations of measurement objects and methods for considering two antennas shown in FIG. 5A are examples. Arbitrary combination can be selected from among nine combinations of measurement objects and methods for considering two antennas shown in FIG. 4. For example, as to path loss, as shown in FIG. 5B, as a method for considering two antennas, either one may be selected from among the method for measuring the value measured by the main single antenna (option 3) and the method for measuring the sum of values measured by two antennas (option 4). When the option 4 is selected, the path loss is calculated by the following equation.

$$\text{Pathloss in dB} = \text{RS Tx power} - \text{RSRP}_{RxAnt,Sum}$$

In the equations, RS Tx power indicates transmission power of the reference signal in the base station apparatus 200, $\text{RSRP}_{RxAnt,Sum}$ indicates the sum of received powers of the reference signal measured by two antennas in the mobile station $100_n$. The RS Tx power is signaled from the base station apparatus 200 to the mobile station $100_n$ by broadcast information and the like, for example.

When option 3 is selected, the value of the path loss becomes one based on reference signal received power measured by the main single antenna or the antenna used for uplink transmission, thus, the option 3 corresponds to measuring path loss in the uplink. In addition, when the option 4 is selected, the value of path loss becomes one based on the sum of received powers of the reference signal measured by two antennas. Thus, the option 4 corresponds to measuring path loss in the downlink.

Alternatively, as to reference signal received power, as indicated in the pattern (c), the system may be configured such that either one can be selected from among the method of measuring the value measured by the main single antenna (option 1) and the method for measuring the sum of values measured by two antennas (option 2), as a method for considering two antennas. In the option 1, instead of measuring the value measured by the main single antenna, a value measured by the antenna used for transmission may be measured.

Alternatively, as to reference signal received power, as indicated in the pattern (d), the system may be configured such that either one can be selected from among the method of measuring an average value of values measured by two antennas (option 1) and the method of measuring the sum of values measured by two antennas (option 2), as a method for considering two antennas. In the option 1, when calculating the average value of values measured by two antennas, the average value may be calculated in consideration of sensitivity of the two antennas. More particularly, by defining weighting coefficients W1 and W2 in consideration of the sensitivity of the two antennas, the average value may be calculated based on W1 and W2 as follows.

$$\text{Reference signal received power} = (W_1 \times (\text{value measured by antenna 1}) + W_2 \times (\text{value measured by antenna 2}))/2$$

Then, the measurement control unit 210 reports, to the mobile station $100_n$, an indicator that is the measurement quantity used for the mobile station $100_n$ residing in the cell 50 to perform measurement report.

More particularly, the measurement control unit 210 reports, to the baseband signal processing unit 208, a measurement control message including the measurement quantity that is the indicator used for the mobile station $100_n$ residing in the cell 50 to perform measurement report. As mentioned above, the measurement control message is reported to the mobile station $100_n$ via the baseband signal processing unit 208, the transmit and receive unit 206, the amplifier unit 204, and the transmit and receive antenna 202.

Alternatively, the call processing unit 210 reports, to the baseband signal processing unit 208, broadcast information on measurement including the measurement quantity that is the indicator used for the mobile station $100_n$ residing in the cell 50 to perform measurement report. As mentioned above, the broadcast information on measurement is reported to the mobile station $100_n$ via the baseband signal processing unit 208, the transmit and receive unit 206, the amplifier unit 204, and the transmit and receive antenna 202 as a part of the broadcast channel.

The call processing unit 212 performs call processing such as setup or release of a communication channel, management of state of the radio base station 200, and management of radio resources.

In addition, the call processing unit 212 receives an RRC message sent from the mobile station $100_n$ that is a measurement report, for example, from the baseband signal processing unit 208. When the call processing unit 212 receives a measurement report, from the mobile station $100_n$, indicating that a cell different from a cell in which communication is currently being performed using Evolved UTRA and UTRAN is the best radio quality cell, the call processing unit 212 performs cell change processing for changing the serving cell from the cell in which communication is being performed to the cell of the best radio quality. The serving cell indicates a cell in which communication is being performed using Evolved UTRA and UTRAN. The radio quality is the measurement quantity specified by the base station apparatus 200. That is, based on the measurement quantity selected by the call processing unit 212 of the base station apparatus 200 based on FIG. 4 or FIG. 5, the mobile station $100_n$ performs measurement, so that cell change is performed based on the measurement result. Accordingly, the base station apparatus selects a method of considering a plurality of antennas for receive diversity, so that cell change is performed based on the selected method of considering the plurality of antennas. Accordingly, a higher quality network can be provided.

Figure 6:
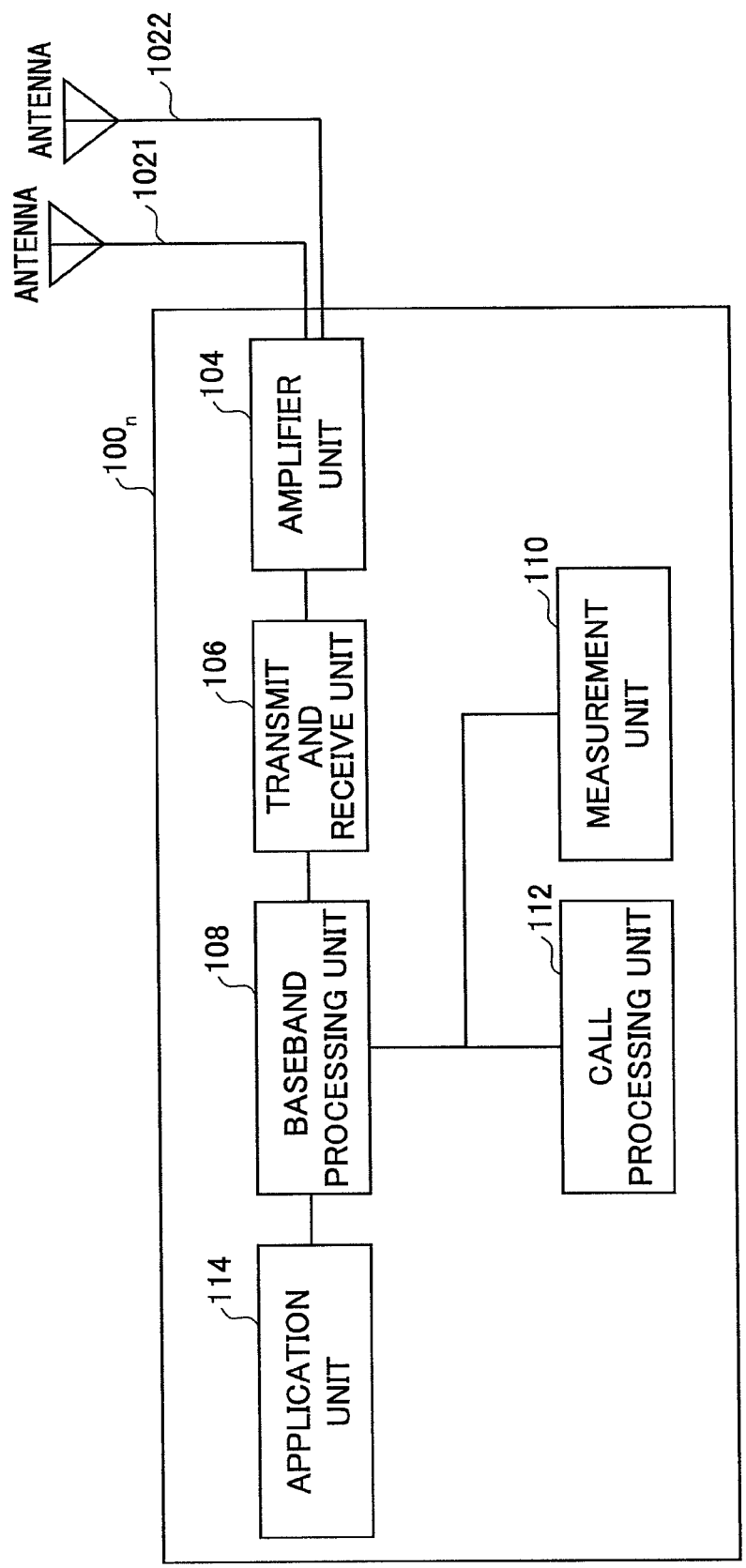
FIG. 6 is a diagram showing a mobile station according to an embodiment of the present invention.

Next, the mobile station $100_n$ of an embodiment of the present invention is described with reference to FIG. 6.

In the figure, the mobile station $100_n$ includes an antenna 1021, an antenna 1022, an amplifier unit 104, a transmit and receive unit 106, a baseband signal processing unit 108, a measurement unit 110, a call processing unit 112, and an application unit 114.

Receive diversity is applied to the mobile station $100_n$. Thus, the mobile station $100_n$ is provided with two antennas that are the antenna 1021 and the antenna 1022. In the two antennas, the antenna 1021 is defined to be the main antenna that is used for uplink transmission. The main antenna or an antenna used for uplink transmission may be fixed or may be variable. For example, when the main antenna or the antenna used for uplink transmission is variable, the main antenna or the antenna used for uplink transmission may be determined based on received power of the downlink reference signal.

As to downlink data, a radio frequency signal received by the antenna 1021, 1022 is amplified by the amplifier unit 104, frequency-converted by the transmit and receive unit 106 so that the signal is converted into a baseband signal. The baseband signal processing unit 108 performs, on the baseband signal, FFT processing, error correction decoding, reception processing of retransmission control, and the like. In the downlink data, downlink user data is transferred to the application unit 112. In addition, in the downlink data, RRC message is transferred to the measurement unit 110 and the call processing unit 112. For example, a measurement control message reported from the base station apparatus 200 is transferred to the measurement unit 110. A message for performing cell selection or cell change reported from the base station apparatus 200 is transferred to the call processing unit 112. Further, in the downlink data, broadcast information on measurement is transferred to the measurement unit 110. In addition, in the downlink data, a downlink reference signal is also transferred to the measurement unit 110.

On the other hand, uplink user data is input into the baseband signal processing unit 108 from the application unit 112. In addition, a measurement report message is input from the measurement unit 110, and a message for performing cell change is input from the call processing unit 112. Each of the measurement report message and the message for cell change is one of RRC messages.

The baseband signal processing unit 108 performs, on the user data and the RRC message, transmission processing of retransmission control (H-ARQ (Hybrid ARQ)), channel coding, DFT processing, IFFT processing and the like, so that the processed signal is transferred to the transmit and receive unit 106. The transmit and receive unit 106 performs frequency conversion processing for converting the baseband signal output from the baseband signal processing unit 108 into radio frequency band. After that, the processed signal is amplified in the amplifier unit 104 and transmitted from the antenna 1021.

The measurement unit 110 receives the measurement control message, broadcast information on measurement and the downlink reference signal from the baseband signal processing unit 108. Then, the measurement unit 110 performs measurement based on the measurement control message or the broadcast information on measurement. The measurement control message or the broadcast information on measurement includes measurement quantity. That is, the measurement unit 110 performs measurement based on a measurement object and a two antennas considering method specified by the measurement control unit 210 in the base station apparatus 200. As methods for specifying the measurement object and the method for considering two antennas, there are specifying methods (option 1, option 2, . . . ) shown in FIG. 4 or FIG. 5.

For example, when the reference signal received power is specified as a measurement object, and measuring a sum of values measured by two antennas is specified as a method for considering two antennas, the measurement unit 110 measures a sum of reference signal received power received by the antenna 1021 and reference signal received power received by the antenna 1022.

In addition, for example, when reference signal received power is specified as a measurement object, and measuring a value measured by main single antenna is specified as a method for considering two antennas, the measurement unit 110 measures reference signal received power received by the antenna 1021 that is used for uplink transmission and that is the main antenna.

Further, for example, when path loss is specified as a measurement object, and measuring a value measured by the main single antenna is specified as a method for considering two antennas, the measurement unit 110 measures path loss based on reference signal received power received by the antenna 1021 that is used for uplink transmission and that is the main antenna. That is, path loss is calculated by the following equation.

$$\text{Pathloss in dB} = \text{RS Tx power} - \text{RSRP}_{TxAnt}$$

In the equation, RS Tx power indicates transmission power of the reference signal in the base station apparatus 200. $\text{RSRP}_{TxAnt}$ indicates reference signal received power in the antenna 1021 that is the main single antenna and is the antenna used for transmission. Rs Tx power is signaled by the base station apparatus 200 using broadcast information, for example.

Further, for example, when path loss is specified as a measurement object, and measuring a sum of values measured by two antennas is specified as a method for considering two antennas, the measurement unit 110 measures path loss based on the sum of reference signal received power received by the antenna 1021 and reference signal received power received by the antenna 1022. That is, path loss is calculated using the following equation.

$$\text{Pathloss in dB} = \text{RS Tx power} - \text{RSPP}_{RxAnt,Sum}$$

In the equation, RS Tx power indicates transmission power of the reference signal in the base station apparatus 200. $\text{RSRP}_{RxAnt,Sum}$ indicates the sum of reference signal received power received by the antenna 1021 and reference signal received power received by the antenna 1022. Rs Tx power is signaled by the base station apparatus 200 using broadcast information, for example.

When the measurement object is path loss and the method for considering two antennas is to measure a value measured by the main single antenna, since the path loss becomes a value based on reference signal received power measured by the main single antenna or the antenna used for uplink transmission, it corresponds to measuring uplink path loss. When the measurement object is path loss and the method for considering two antennas is to measure the sum of values measured by two antennas, since the path loss becomes a value based on the sum of received powers of the reference signal measured by two antennas, it corresponds to measuring downlink path loss.

As one of the above-mentioned measurements, the measurement unit 110 performs best cell measurement for determining which cell has the best radio quality. The radio quality is the measurement quantity included in the measurement control message or in the broadcast information on measurement, and is specified by the base station apparatus 200 as mentioned above. That is, the mobile station $100_n$ performs measurement for the best cell based on the measurement quantity selected by the call processing unit 212 in the base station apparatus 200 from FIG. 4 or FIG. 5, that is, based on the measurement object and the method for considering two antennas.

When a cell having better radio quality than the quality of the current best cell appears, the measurement unit 110 generates a measurement report message for reporting the cell having the better radio quality than the current best cell, and reports the measurement report message to the baseband signal processing unit 108. When determining that a cell having better radio quality than the quality of the current best cell appears, hysteresis on radio quality and time hysteresis (Time To Trigger) may be considered. The best cell is a variable, indicating a cell having the best radio quality, stored in the mobile station $100_n$.

In the above-mentioned example, a case is explained in which the mobile station has two antennas and one of them is used as a transmission antenna, and two of them are used for reception antenna. Alternatively, the mobile station may be provided with three antennas, and one of them may be used as a transmission antenna and remaining two may be used as reception antennas. In this case, as the method for considering two antennas, when measuring the sum of values measured by two antenna or measuring average value of values measured by two antennas is specified, measurement is performed for two antennas used for reception. As a method for considering two antennas, when measuring a value measured by the main single antenna is specified, measurement is performed for one antenna used for transmission.

In the above-mentioned example, a case is explained in which the mobile station has two antennas and one of them is used as a transmission antenna, and two of them are used for reception antenna. Alternatively, the mobile station may be provided with two antennas, and two of them may be used as transmission antennas and as reception antennas. In this case, as the method for considering two antennas, when measuring the sum of values measured by two antennas or measuring average value of values measured by two antennas is specified, measurement is performed for the two antennas. Even when measuring a value measured by the main single antenna is specified as the method for considering two antennas, measurement is performed for the two antennas. For example, if measuring a value measured by the main single antenna is specified as the method for considering two antennas, average value of values measured by two antennas may be measured.

The call processing unit 112 performs call processing such as setup and release of communication channels, and performs management of state of the mobile station $100_n$. In addition, the call processing unit 112 receives a message for performing cell selection or cell change reported from the base station apparatus 200 from the baseband signal processing unit 108. Then, the call processing unit 112 performs processing for cell change based on the message for performing cell selection. In addition, the call processing unit 112 generates an RRC message for performing cell change, and reports the RRC message to the baseband signal processing unit 108. That is, the call processing unit 212 in the base station apparatus 200 and the call processing unit 112 in the mobile station $100_n$ exchange RRC messages for performing cell change.

The application unit 114 performs processing for upper layers of the physical layer and the MAC layer.

As mentioned above, the base station apparatus 200 selects a method for considering a plurality of antennas in receive diversity, and the mobile station $100_n$ performs measurement of the best cell based on the selected method for considering a plurality of antennas, and performs cell change based on the measurement result of the best cell, so that a higher quality network can be provided.

Figure 7:
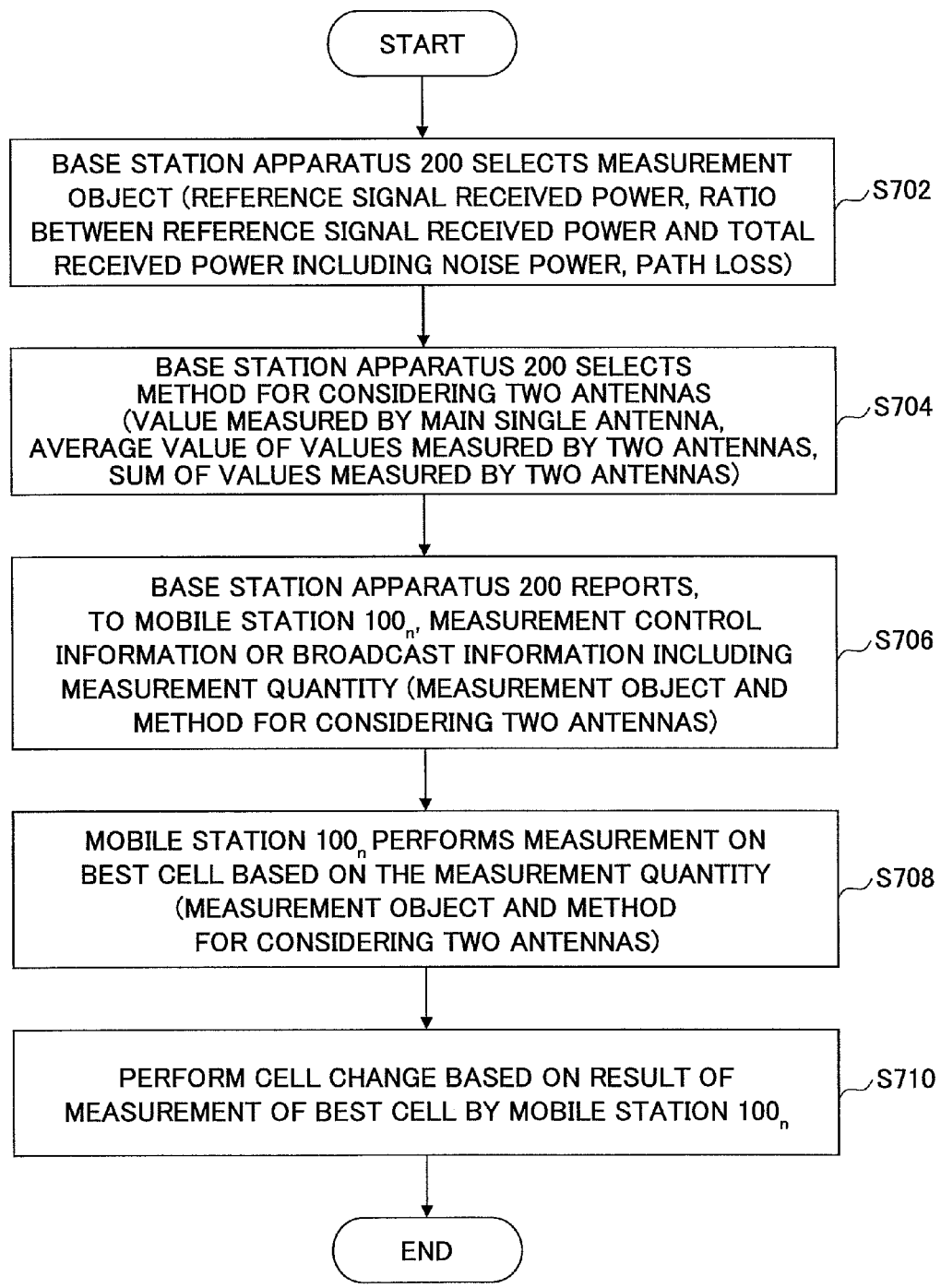
FIG. 7 is a flowchart showing an operation example according to an embodiment of the present invention.

Next, a communication control method of the present embodiment is described with reference to FIG. 7.

In step S702, the measurement control unit 210 in the base station apparatus 200 selects a measurement object shown in FIG. 4. More particularly, the base station apparatus 200 selects one of the reference signal received power, the ratio between reference signal received power and total received power including noise power, and path loss, as the measurement object.

In step S704, the measurement control unit 210 in the base station apparatus 200 selects a method for considering two antennas shown in FIG. 4. More particularly, the base station apparatus 200 selects one of the value measured by the main single antenna, the average value of values measured by two antennas, and the sum of values measured by two antennas, as a method for considering two antennas.

In step S706, the base station apparatus 200 reports, to the mobile station $100_n$, a measurement control message or broadcast information including measurement quantity indicating the measurement object and the method for considering two antennas.

In step S708, the measurement unit 110 in the mobile station $100_n$ performs measurement on the best cell based on the measurement quantity indicating the measurement object and the method for considering two antennas.

In step S710, cell change is performed based on the measurement on the best cell performed by the mobile station $100_n$ in step S708. More particularly, the mobile station $100_n$ reports a measurement report on the best cell to the base station apparatus 200. When the best cell is different from the serving cell at the present timing, the base station apparatus 200 determines to change the best cell into serving cell. Then, RRC messages for performing cell change are exchanged between the base station apparatus 200 and the mobile station $100_n$, so that processing for cell change is performed.

Figure 8:
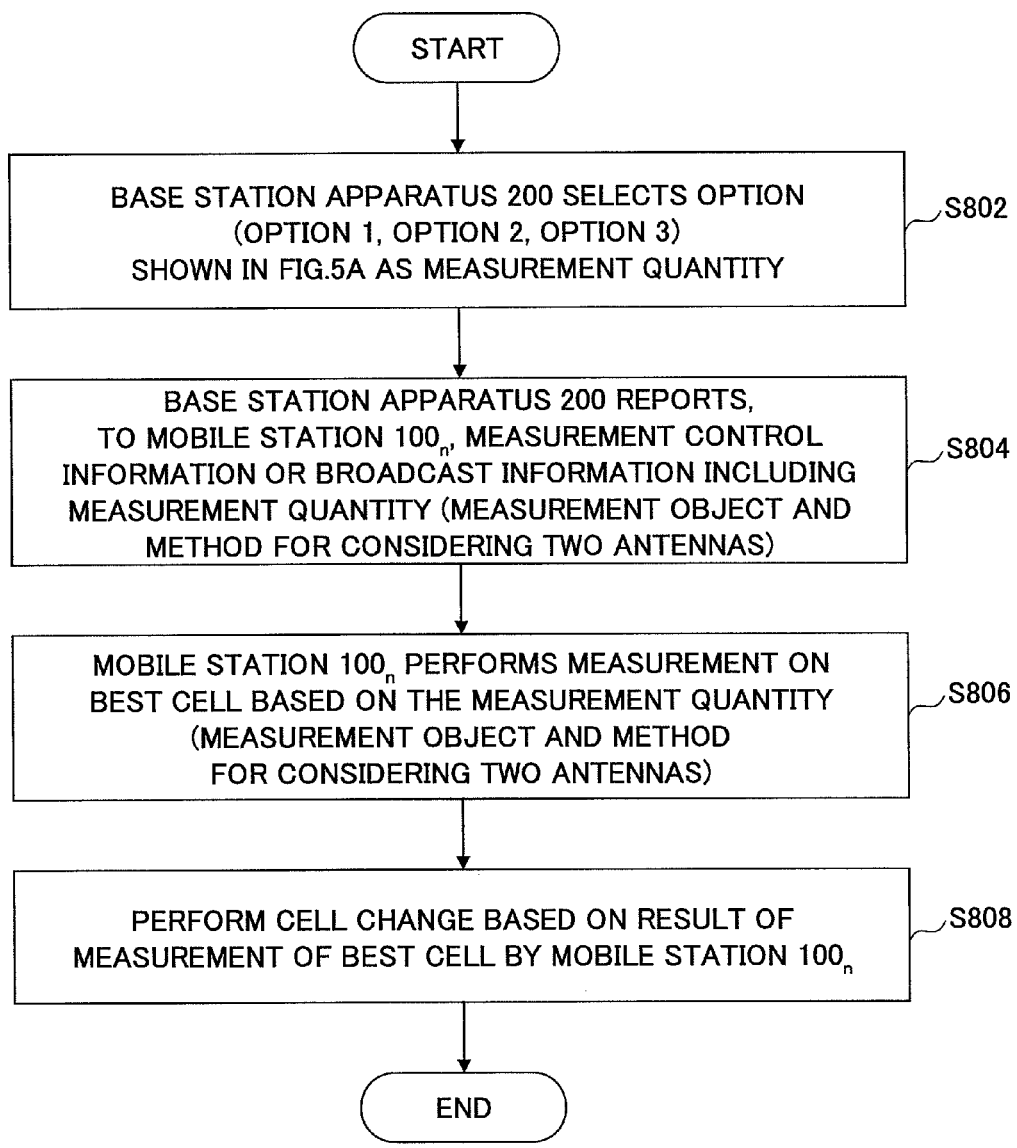
FIG. 8 is a flowchart showing an operation example according to an embodiment of the present invention.

Next, a communication control method of the present embodiment is described with reference to FIG. 8.

In step S802, the measurement control unit 210 in the base station apparatus 200 selects an option shown in FIG. 5A. More particularly, the base station apparatus 200 selects the option 1, the option 2 or the option 3 as a combination of measurement object and method for considering two antennas.

In step S804, the base station apparatus 200 reports, to the mobile station $100_n$, a measurement control message or broadcast information including measurement quantity indicating the measurement object and the method for considering two antennas that are determined by selecting the option.

In step S806, the mobile station $100_n$ performs measurement on the best cell based on the measurement quantity indicating the measurement object and the method for considering two antennas.

In step S808, cell change is performed based on measurement on the best cell that is performed by the mobile station $100_n$ in step S708. More particularly, the mobile station $100_n$ reports the measurement report on the best cell to the base station apparatus 200. When the best cell is different from the serving cell at the present timing, the base station apparatus 200 determines to change the best cell into serving cell. Then, RRC messages for performing cell change are exchanged between the base station apparatus 200 and the mobile station $100_n$, so that processing for cell change is performed.

According to the embodiments of the present invention, the base station apparatus selects a method for considering two antennas such as the sum of values measured by two antennas, the average value of values measured by two antennas and the value measured by the main single antenna in addition to the object to be measured by the mobile station such as the reference signal received power, the ratio between reference signal received power and total received power including noise power, and the path loss. Then, the base station apparatus specifies them to the mobile station. Thus, flexible cell design for each cell or for each operator can be realized. As a result, it becomes possible to realize a mobile station, a base station apparatus, a mobile communication system and a communication control method that can provide high quality network.

In the above-mentioned embodiments, although a case is shown in which receive diversity is performed using two antennas, the present invention can be applied to cases in which more than two antennas are used.

In addition, although the above-mentioned examples show three kinds of measurement objects that are the reference signal received power, the ratio between reference signal received power and total received power including noise power, and the path loss, the present invention can be applied to measurement objects other than the three. For example, as one other than the above-mentioned ones, SIR (Signal-to-Interference Ratio) of the reference signal and the like can be considered.

In addition, in the above-mentioned example, an example is explained in which the mobile station performs measurement of the best cell based on the measurement object and the method for considering two antennas that are specified by the base station apparatus, and processing for cell change is performed based on the measurement result of the best cell. The mobile station, the base station apparatus, the mobile communication system and the communication control method can be applied also to other measurements. For example, instead of the measurement of the best cell, the present invention can be applied to measurement of radio quality of different frequencies and measurement of radio quality of different systems. Alternatively, the present invention may be applied to measurement for monitoring neighbor cells. The measurement for monitoring neighbor cells may be used for transmission power control of uplink or downlink considering interference from neighbor cells, for example. Alternatively, the present invention may be applied to measurement of path loss for determining uplink transmission power.

In the above-mentioned embodiment, although examples are explained in a system to which Evolved UTRA and UTRAN (another name: Long Term Evolution or Super 3G) is applied, the mobile station, the base station apparatus, the mobile communication system and the communication control method of the present invention can be applied to all systems that perform communication using a shared channel. For example, the present invention can be also applied to WCDMA and HSDPA in 3GPP.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-050836, filed in the JPO on Feb. 28, 2007 and the entire contents of the Japanese patent application No. 2007-050836 is incorporated herein by reference.

The invention claimed is:

1. A user apparatus for commutating with a base station apparatus, comprising:
    a plurality of antennas which include at least two receiving antennas;
    a reception unit configured to receive signaling that specifies a combination of a measurement object and a measurement method for the measurement object, wherein the measurement method specifies one or the plurality of antennas used for measuring the measurement object; and
    a measurement unit to perform measurement based on the specified combination of the measurement object and the measurement method,
    wherein the measurement object is represented as one or more of reference signal received power, a ratio between reference signal received power, and total received power including noise power, and path loss, and
    wherein the measurement method is represented as one of measuring a sum of values measured by the two receiving antennas, measuring an average value of values measured by the two receiving antennas, and measuring a value measured by an antenna used for uplink transmission.

2. The user apparatus as claimed in claim 1, wherein, when the measurement object is the path loss and when the measurement method is to measure a value measured by the antenna used for uplink transmission,
    assuming that RS Tx power is transmission power of the reference signal in the base station apparatus and that RSRPTxAnt is reference signal received power measured by the antenna used for uplink transmission, the path loss is calculated by Pathloss in dB=RS Tx power−RSRPTxAnt.

3. A user apparatus for commutating with a base station apparatus, comprising:
- a plurality of antennas which include at least two receiving antennas;
- a reception unit configured to receive signaling that specifies a combination of a measurement object and a measurement method for the measurement object, wherein the measurement method specifies one or the plurality of antennas used for measuring the measurement object; and
- a measurement unit to perform measurement based on the specified combination of the measurement object and the measurement method,
- wherein, when the measurement object is the reference signal received power, measuring the sum of values measured by the two receiving antennas is specified as the measurement method,
- when the measurement object is the path loss, measuring the value measured by the antenna used for uplink transmission is specified as the measurement method.

4. The user apparatus as claimed in claim 3, wherein, assuming that RS Tx power is transmission power of the reference signal in the base station apparatus and that RSRPTxAnt is the reference signal received power measured by the antenna used for uplink transmission, the path loss is calculated by Pathloss in dB=RS Tx power−RSRPTxAnt.

5. The user apparatus as claimed in claim 3, wherein the measurement unit measures a cell having the best radio quality, and the user apparatus further comprising:
- a reporting unit configured to report the cell having the best radio quality to the base station apparatus.

6. The user apparatus as claimed in claim 1, wherein the signaling is included in a radio resource control message (RRC message) or a broadcast channel.

7. A base station apparatus for communicating with a user apparatus having a plurality of antennas in a mobile communication system, comprising:
- a unit configured to determine a combination of a measurement object and a measurement method for the measurement object, wherein the measurement method specifies one or the plurality of antennas which include at least two receiving antennas used for measuring the measurement object; and
- a report unit configured to report the determined combination of the measurement object and the measurement method to the user apparatus,
- wherein the measurement object is represented as one or more of reference signal received power, a ratio between reference signal received power and total received power including noise power, and path loss, and
- wherein the measurement method is represented as one of measuring a sum of values measured by the two receiving antennas, measuring an average value of values measured by the two receiving antennas, and measuring a value measured by an antenna used for uplink transmission.

8. A base station apparatus for communicating with a user apparatus having a plurality of antennas in a mobile communication system, comprising:
- a unit configured to determine a combination of a measurement object and a measurement method for the measurement object, wherein the measurement method specifies one or the plurality of antennas which include at least two receiving antennas used for measuring the measurement object; and
- a report unit configured to report the determined combination of the measurement object and the measurement method to the user apparatus, wherein, when the measurement object is the reference signal received power, the base station apparatus specifies measuring the sum of values measured by the two receiving antennas as the measurement method,
- when the measurement object is the path loss, the base station apparatus specifies measuring the value measured by the antenna used for uplink transmission as the measurement method.

9. A communication control method in a mobile communication system including a user apparatus having a plurality of antennas and a base station apparatus for performing communication with the user apparatus, comprising:
- a step in which the base station apparatus specifies a combination of a measurement object and a measurement method for the measurement object, wherein the measurement method specifies one or the plurality of antennas which include at least two receiving antennas used for measuring the measurement object;
- a step in which the user apparatus performs measurement of a cell having the best radio quality based on the measurement method; and
- a step of performing cell change based on the measurement result of the cell having the best radio quality,
- wherein the measurement object is represented as one or more of reference signal received power, a ratio between reference signal received power, and total received power including noise power, and path loss, and
- wherein the measurement method is represented as one of measuring a sum of values measured by the two receiving antennas, measuring an average value of values measured by the two receiving antennas, and measuring a value measured by an antenna used for uplink transmission.

10. The user apparatus as claimed in claim 1, wherein the measurement unit measures a cell having the best radio quality, and the user apparatus further comprising:
- a reporting unit configured to report the cell having the best radio quality to the base station apparatus.

11. A communication control method in a mobile communication system including a user apparatus having a plurality of antennas and a base station apparatus for performing communication with the user apparatus, comprising:
- a step in which the base station apparatus specifies a combination of a measurement object and a measurement method for the measurement object, wherein the measurement method specifies one or the plurality of antennas which include at least two receiving antennas used for measuring the measurement object;
- a step in which the user apparatus performs measurement of a cell having the best radio quality based on the measurement method; and
- a step of performing cell change based on the measurement result of the cell having the best radio quality,
- wherein, when the measurement object is the reference signal received power, measuring the sum of values measured by the two receiving antennas is specified as the measurement method, and wherein, when the measurement object is the path loss, measuring the value measured by the antenna used for uplink transmission is specified as the measurement method.

* * * * *